United States Patent Office 3,217,278
Patented Nov. 9, 1965

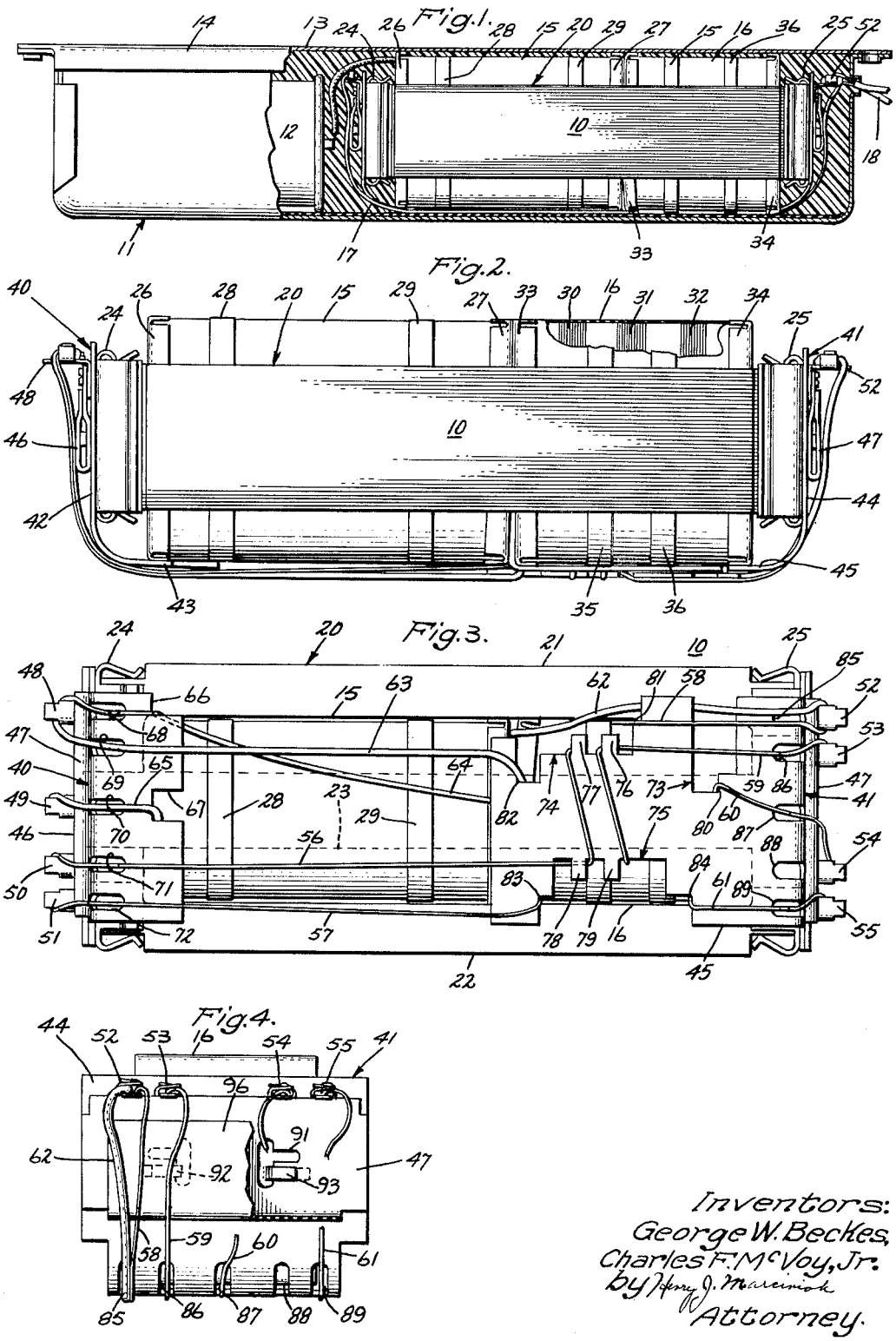

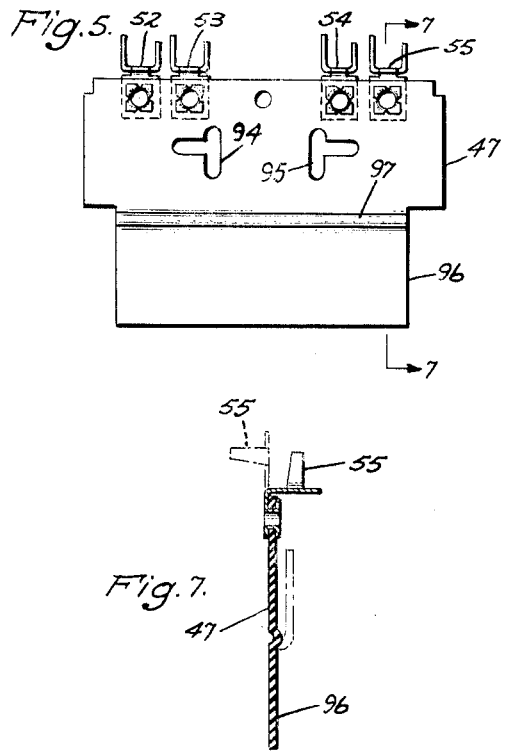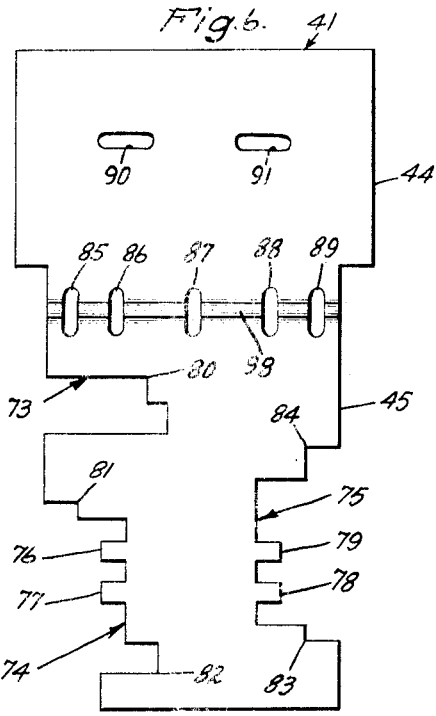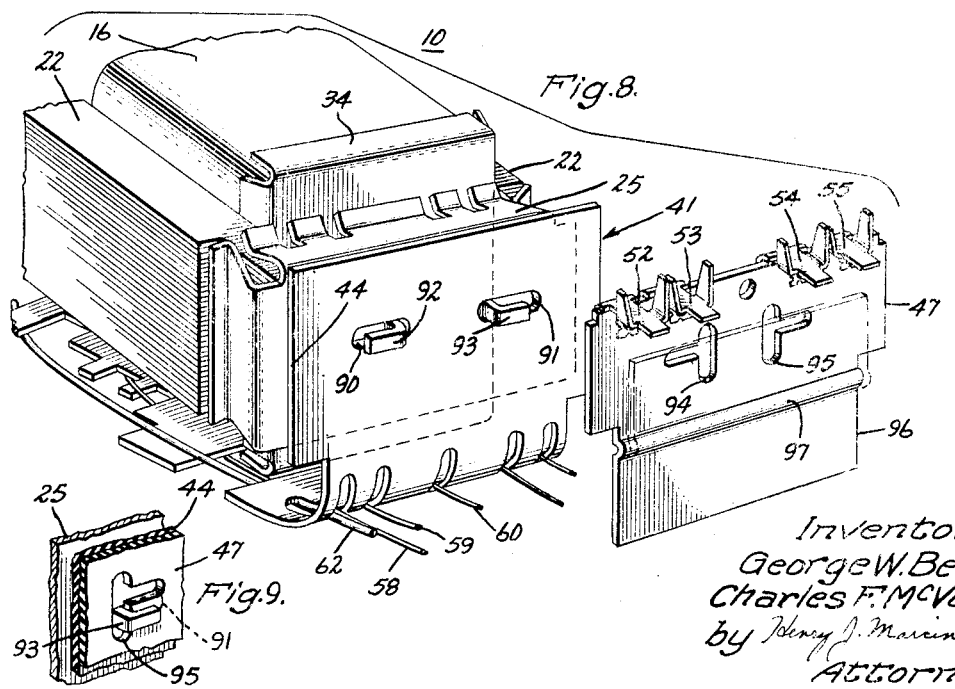

3,217,278
CORE AND COIL ASSEMBLIES AND ELECTRICAL TERMINAL LEAD ARRANGEMENTS THEREFOR
George W. Beckes and Charles F. McVoy, Jr., Danville, Ill., assignors to General Electric Company, a corporation of New York
Filed Dec. 11, 1962, Ser. No. 243,839
10 Claims. (Cl. 336—192)

This invention relates to magnetic core and coil assemblies and electrical terminal lead arrangements for magnetic core and coil assemblies. More particularly, it relates to such assemblies for use in shell type of transformers.

In the shell type of transformers, such as are generally used in ballasts for operating fluorescent lamps, the coils containing the transformer windings are mounted on a center winding leg within the window space provided between the outer yoke members of the core and the center winding leg. Thus, magnetic core steel is disposed at the outer sides and outer ends of the coils. To prevent possible grounding of the start and finish leads of the various windings in the coil, the leads must be brought out from the coil and positioned so that they do not come in contact with the magnetic core or the core clamps which hold the core in assembled relation.

The start and finish leads of the various windings are usually brought out to the top side of the coil, and the electrical connections to the start and finish leads of the coils are made on a terminal strip or pad attached to the coil. It is required that these start and finish leads not only be prevented from grounding by contacting the core or case but also that some of the leads be prevented from contacting each other and causing short circuits. Also, the coil leads should be placed so that they can be readily connected in electrical circuit with other leads and components of the ballast. It is desirable that these start and finish leads be securely positioned so that the core and coil assembly can be handled during the assembly operation.

It will be appreciated that the core and coil assembly is usually disposed in a cannister or case, and before the cannister or case is filled with potting material, the core and coil assembly is connected with the other components of the apparatus, such as the power factor capacitor, the radio interference capacitor, the grounding resistor and the various leads which are brought out to the lamp and to the power supply. Whether the core and coil assembly is potted or encapsulated in a resin, the assembly is handled in the course of its manufacture. Therefore, it is desirable that normal handling does not cause a displacement of the leads that might result in grounding of lead or a short circuit. Further, since terminal pads mounted on the top side of the coil increase the over-all height of the assembly, it is desirable that the terminal lead connections be made where they will not add to the height of the core and coil assembly. It will be appreciated that the coil height is a critical factor in many ballast designs since limits on the cross-sectional dimensions of a ballast are imposed by fixture manufacturers.

Accordingly, it is a general object of the present invention to provide an improved magnetic core and coil assembly.

Another object of the present invention is to provide an improved terminal lead arrangement for electrical coils disposed on a shell type of magnetic core and coil assembly.

It is another object of the invention to provide an improved arrangement for positioning and aligning the start and finish conductors on a magnetic core and coil assembly.

A further object of the invention is to provide an improved core and coil assembly in which the coil conductors are readily connected in circuit with other electrical components.

It is still a further object of the invention to provide an improved core and coil assembly in which the terminal connections can be readily dip-soldered.

In accordance with one form of our invention we have provided an improved magnetic core and coil assembly in which a coil lead positioning member is disposed at each end of the assembly. The magnetic core is held in assembled relation by a core clamp at each end thereof. Preferably, the positioning member is formed of a sheet of insulating material and may include a positioning part, such as a flap disposed at one side of the coil, and an attaching part, such as a flap disposed vertically along the core clamp. The positioning member is secured in a fixed relation with the coil and core assembly and is formed with a plurality of indentations, so that leads from the coil are maintained in desired spaced and positional relation by the indentations. The positioning member may be formed with a plurality of laterally aligned slots formed on the folded over or angulated portion of the positioning member. The slots serve to maintain the coil leads in desired spaced relation as the coil leads are brought out over the attaching flap and also maintain the leads substantially in alignment with terminals provided near the edge of the core clamps. Preferably, the terminals are horizontally aligned so that connections to the terminals can be readily made by soldering.

According to another aspect of the invention, the attaching flap of the positioning member and a terminal pad mounted thereon are formed with a pair of apertures. To maintain the positioning member and the terminal pad in fixed relationship with respect to coil and core assembly, a pair of L-shaped tabs are formed on the core clamp. Each of the apertures formed in the attaching flap and the terminal pad includes a portion that registers with the tab on the core clamp to allow the positioning member and the terminal pad to be disposed in engaging relationship with the tabs when moved under the tabs. The terminal pad is provided with a folded over flap to cover the tabs in order to prevent the tabs from contacting the leads which extend over the terminal pad.

The subject matter which we regard as our invention is set forth in the appended claims. The invention itself, however, together with further objects and advantages thereof may be best understood by referring to the following description taken in connection with the accompanying drawings in which:

FIGURE 1 is a front elevational view of a ballast with the potting compound and a part of the case cut away to show a magnetic core and coil assembly embodying one form of the invention;

FIGURE 2 is a front elevational view of the magnetic core and coil assembly;

FIGURE 3 is a bottom view of the magnetic core and coil assembly shown in FIGURE 2;

FIGURE 4 is a side elevational view of the right side of the magnetic core and coil assembly shown in FIGURE 2;

FIGURE 5 is a plan view of the terminal pad used in the core and coil assembly shown in FIGURES 2 and 3;

FIGURE 6 is a plan view of a coil lead positioning member used in the core and coil assembly shown in FIGURES 2 and 3 before assembly;

FIGURE 7 is a sectional view of the terminal pad shown in FIGURE 5 taken along line 7—7;

FIGURE 8 is a fragmentary perspective view of one end of the core and coil assembly showing the terminal pad positioned for assembly on the core clamp; and FIGURE 9 is a fragmentary view showing how the tabs of the core clamp are crimped to hold the positioning member and the terminal pad in fixed relation with respect to the core.

Having more particular reference now to FIGURE 1, a core and coil assembly 10 embodying the invention is shown in a ballast case 11. The core and coil assembly 10 and a power capacitor 12 are potted with an asphaltic type of potting material 13. The ballast case 11 includes a cover plate 14 which is disposed against the one side of coils 15 and 16 to provide for efficient heat transfer from the core and coil assembly 10. It will be appreciated that the cover plate 14 is generally attached to a lamp fixture which serves as a heat sink for heat generated within the coils and core. Since the main path of heat transfer is generally through the cover plate 14 to the fixture on which the ballast case 11 is mounted, it will be seen that none of the start and finish leads of the coils 15 and 16 are brought out from the coils 15 and 16 to the sides adjacent to the cover plate 14. The start and finish leads are insulated from the ballast case 11 by a strip 17 of ground insulation which extends along the length of the case 11.

It will be appreciated that the core and coil assembly 10 may be first placed in the case 11 with the coils 15 and 16 resting on the strip 17 of ground insulation. The final assembly of the core and coil assembly may now be carried out by connecting the coils 15 and 16 in circuit with the other components, such as the power factor capacitor 12, and the leads 18 brought out externally of the ballast case 11 for connection to the lamps and to the power source. The core and coil assembly 10 may then be filled with a hot liquid material. This is the conventional way of potting a ballast. Preferably, however, with the terminal lead arrangement of the invention, it is possible to carry out the potting operation by first placing the core and coil assembly 10 in a ballast case 11 filled with a measured amount of the liquid potting material. By placing the core and coil assembly 10 into the liquid potting material, it was found that better filling is achieved under the core and coil assembly 10 as compared to the potting operations where the potting material is poured over the core and coil assembly 10.

Having more specific reference now to FIGURES 2, 3 and 4, we have shown therein more detailed views of the magnetic core and coil assembly 10. As will be seen in the view of FIGURE 3, the magnetic core 20 is comprised of a pair of outer yoke members 21 and 22 and a center winding leg 23 on which the coils 15 and 16 are mounted. The magnetic core 20 is held in assembled relation by a pair of core clamps 24 and 25. The yoke members 21 and 22 and the center winding leg 23 are formed of stacks of horizontally extending laminations of magnetic material.

The coil 15 contains the secondary winding turns and is formed of a plurality of superposed layers of conductor wire. The end turns of the coil 15 are insulated by a pair of insulating members 26 and 27 as will be seen in FIGURE 2. The coil 15 is wound on a spool (not shown) which serves to insulate the inner turn layers from the center winding leg 23. The outer turn layers are protected by a coil wrapper of kraft paper which is held on the coil by strips 28 and 29 of pressure sensitive tape. Coil 16, which contains the primary winding and the filament heating windings 30, 31 and 32, which can be seen in FIGURE 2, is similar in construction to coil 15. The coil 16 is also comprised of turns of magnetic wire wound over a spool. Paper insulation is wound over the outer turns layer of the primary winding and the filament heating windings 30, 31 and 32. The end turns of the coil 16 are protected by insulating members 33 and 34. The paper insulation coil wrapper is securely held by means of strips 35 and 36 of pressure sensitive tape in assembled relation with the coil 16.

Referring more particularly now to FIGURE 2, it will be seen that the start and finish leads of the coils 15 and 16 are brought out at bottom side of the coils 15 and 16 so that the top side of the coils 15 and 16 is not encumbered by any leads or terminal connection pads. It will be seen that an angulated positioning member 40 is attached to core clamp 24 and is folded over a corner of the coil and core assembly 10 to form an attaching part or flap 42 disposed along the vertically extending web portion of clamp 24 and a positioning part or flap 43 disposed at the side of coil 15. Similarly, at the right end of the core and coil assembly 10, another angulated positioning member 41 having an attaching flap 44 secured to the core clamp 25 and includes a positioning flap 45 disposed at the side of coil 16. The positioning members 40 and 41 are formed of flexible sheets of insulating material, such as kraft paper.

In the illustrated exemplification of our invention, we have provided a separate terminal pad 46 and 47 at each end of the core and coil assembly 10. At the left end of the core and coil assembly 10, the terminal pad 46 is attached to core clamp 24. Four horizontally aligned terminals 48, 49, 50 and 51 are attached along an edge of the terminal pad 46. Similarly at the right end of the core and coil assembly 10, a terminal pad 47 is attached to core clamp 25 and four horizontally aligned terminals 52, 53, 54 and 55 are provided.

As is illustrated in FIGURE 3, two of the filament heating winding leads 56 and 57 are brought out and connected to the terminals 50 and 51 of the terminal pad 46. The other four heating winding leads 58, 59, 60 and 61 are brought out and connected to the terminals 52, 53, 54 and 55 of the terminal pad. It will be noted that the start lead 62 of the primary winding of coil 16 is connected to terminal 52 and the finish lead 63 is joined at terminal 48 at the opposite end of the assembly 10. The start lead 64 of the secondary winding of coil 15 is also joined at terminal 48. The finished lead 65 of coil 15 is connected to terminal 49.

It will be seen in the view shown in FIGURE 3 that positioning flap 43 of positioning member 40 is formed with indentations 66 and 67 which maintain the positional relationship of leads 64 and 65. The indentations 66 and 67 provide a means for anchoring the leads 64 and 65 and keep the leads in a desired spaced relation. Further, it will be noted that the positioning member 40 is formed with a plurality of slots 68, 69, 70 and 71 that are cut out at the angulated or folded over portion of the member 40. The slots 68, 69, 70, 71 and 72 serve to position the leads 66, 63, 65, 56 and 57 in the desired spaced relation and substantially align the leads with the terminals for connection therewith.

Referring now to FIGURES 3 and 6, the positioning flap 45 of the angulated positioning member 41 is formed with essentially three indentations 73, 74 and 75. Lead 60 is anchored at a corner 80 of indentation 73. Indentations 74 and 75 are formed with laterally extending fingers 76, 77 and 78, 79. Thus, it will be seen that the fingers 77 and 78 serve as an anchoring and positioning means for lead 56. Similarly, the fingers 76 and 79 serve as an anchoring and positioning means for lead 59. Corners 81 and 82 formed by indentation 74 position leads 58 and 63. Also, it will be seen that leads 57 and 61 are positioned by the corners 83 and 84 formed by indentation 75. To maintain the spaced relation and alignment of the leads with the terminals 52, 53, 54 and 55 a plurality of slots 85, 86, 87, 88 and 89 are formed in the fold of positioning member 41.

Having more particular reference now to FIGURES 4, 5, 6, 7, 8, and 9, the specific parts of terminal assembly arrangement of the invention will now be more fully described. Since the mounting and assembly arrangement for the terminal pads 46 and 47 and the positioning members 40 and 41 is essentially the same, the arrangement at the right end of the core and coil assembly 10 as seen in FIGURES 1, 2 and 3, will be specifically considered. It will be seen that from the partially exploded view of FIGURE 8 that the positioning member 41 is first assembled on the core clamp by placing a pair of apertures 90 and 91 formed in the attaching flap 44 over L-shaped securing tabs 92 and 93 formed on the vertically extending web portion of core clamp 25. Terminal pad 47 is also formed with a pair of apertures 94 and 95 which are spaced and shaped to register with the securing tabs 92 and 93. Thus, the attaching flap 44 and the terminal pad 47 are assembled on the core clamp 25 by placing them over the tabs 92 and 93 so that the portions of the apertures 90, 91, 94 and 95, which register with the tabs 92 and 93, pass over the tabs 92 and 93. The terminal pad 47 is moved vertically upward so that a solid part of terminal pad 47 will be beneath the tabs 92 and 93. The tabs 92 and 93 may be then crimped inwardly to securely hold both the positioning member 41 and the terminal pad 47 in fixed relation with respect to the core and coil assembly 10.

As will be seen in FIGURES 4 and 5, the terminal pad 47 is formed with an insulating flap 96. To facilitate forming the flap 96, the terminal pad 47 is provided on preformed crease 97. The insulating flap 96 serves the purpose of preventing the leads connected to the terminals 52, 53, 54, and 55 grounding against the metallic tabs 92 and 93. With the terminal pads 46 and 47 and the positioning members 40 and 41 assembled on the core clamps 24 and 25, the coil leads are positioned as shown in FIGURE 3 in the positioning members 40 and 41. When all of the coil leads are mechanically secured, the leads may be simultaneously soldered by dipping the terminals 48, 49, 50, 51, 52, 53, 54, and 55 in hot solder.

Although in the illustrated embodiment of our invention, we have shown the positioning member and terminal pads as being separate parts of the assembly, it will be appreciated that the terminal pad may be integrally formed with the positioning member. Where such an arrangement is employed, a tab insulating means, such as a piece of pressure sensitive insulating tape applied over the tabs or insulating flaps formed on the positioning member, may be provided to insulate the tabs from the conductor leads.

Referring now more particularly to FIGURES 5 and 7, it will be seen that the terminal pad 47 is provided with a plurality of terminals 52, 53, 54 and 55 which are secured along the upper edge of the terminal 47 by means of eyelets. The terminals are horizontally aligned near the edge so that soldering of all the terminals can be simultaneously effected by a dipping process. The terminals 52, 53, 54 and 55 are formed with two upstanding tabs which are bent to mechanically hold the coil leads and other connecting leads in position. The transversely extending portions of apertures 94 and 95 are formed to register with the tabs 92 and 93 formed on the core clamp 25 and permit the terminal pad 47 to be placed over the tabs 92 and 93. The vertically extending portions of apertures 94 and 95 are provided so that the terminal pad 47 can be aligned in a vertical direction so that the metallic tabs 92 and 93 of the core clamp 25 will be in an overlying relationship with the terminal pad 47 and can then be crimped to firmly secure the terminal pad 47 in fixed relation with the core and coil assembly 10. As is shown in the cross sectional view of FIGURE 7, the terminal pad 47 is formed with the crease 97 so that it can be readily bent to form the insulating flap 96 by folding over the flap 96 on the metallic tabs 92 and 93.

In FIGURE 6 we have illustrated the positioning member 41 as it appears before it is assembled on the core and coil assembly 10. The apertures 90 and 91 are formed to pass over the metallic tabs 92 and 93 of the core clamp 25 and when the tabs 92 and 93 are crimped both the positioning number 41 and the terminal pad 47 are secured to the core clamp 25. A series of laterally aligned slots 85, 86, 87, 88 and 89 are cut out, and a crease 98 is provided to insure that when the positioning member 41 is folded over the edge of the core and coil assembly 10, the bending will take place along an axis that is substantially perpendicular to and bisects the slots 85, 86, 87, 88 and 89. When folded over in this manner, the slots 85, 86, 87, 88 and 89 can effectively position the coil leads.

The positioning member 41 is formed with the indentations 73, 74 and 75. The form and shape of the indentations will depend upon the number of leads to be positioned and the position of the terminals to which the leads are to be connected. As will be seen by referring also to FIGURE 3, the corners 80, 81, 82, 83 and 84 and the fingers 76, 77, 78 and 79 are provided to maintain the leads in a desired spaced relation and to align the leads so that they can be run out to the connecting terminals without contacting or crossing leads that might cause a short circuit.

From the foregoing description it will be apparent that the coil leads from a bottom side of a coil may be readily positioned at any desired location and readily connected to a plurality of horizontally aligned terminals provided near the top of the coil where they can be connected in circuit with other components and leads by dip-soldering. It will be appreciated that more efficient and economical electrical connections can be made near the top of the coil since it is possible to use shorter lengths of the relatively more expensive insulated wire leads. Further, it will be appreciated that the core and coil assembly can be subjected to normal handling without displacing the leads. Also, in the terminal lead arrangements of the invention, improper connections of the coil leads to terminals are minimized since the coil leads are substantially aligned with the terminals to which connections are to be made thereby insuring that the leads will be properly connected.

Although a specific embodiment of the invention has been shown and described, it will be appreciated that many modifications may be made. It will be understood therefore, that it is intended in the appended claims to cover all modifications that come within the spirit and scope of the invention as defined in the appended claims.

What we claim as new and desire to secure by Letters Patent of the United States is:

1. A magnetic core and coil assembly comprising an elongate shunt type magnetic core having a pair of yoke members and a center winding leg, said yoke member being disposed at the sides of said center winding leg to define coil receiving windows therewith, said yoke members and said winding leg being formed of horizontally extending laminations, at least a pair of coils disposed on said center winding leg within said coil receiving windows and having a top side and a bottom side extending outwardly of said magnetic core, a core clamp disposed at each end of said magnetic core and holding said magnetic core in assembled relation, each of said core clamps having a web portion disposed vertically at the end of the magnetic core, at least one lead positioning member, said positioning member being formed of a sheet of insulating material folded over a corner of the magnetic core to form a positioning flap and an attaching flap, said positioning flap being disposed along at least a portion of one side of said coil and said attaching flap being disposed along the web portion of the core clamp and held in fixed relationship therewith, said positioning flap having a plurality of indentations, a plurality of coil leads positioned in desired spaced relation by said indentations, and a plurality of terminals at at least one end of said core, said coil leads being connected to said terminals and terminals being aligned horizontally with respect to each other and supported on one of said core clamps but insulated therefrom.

2. The magnetic core and coil assembly set forth in claim 1 wherein said positioning member is formed with a plurality of laterally aligned slots on the folded over portion of said member to maintain said conductors in a desired positional relationship with respect to one another.

3. A magnetic core and coil assembly comprising a magnetic core having a pair of yoke members and a center winding leg, said yoke members being disposed along the sides of center winding leg, said yoke members and said center winding leg being formed of horizontally extending laminations, at least one coil mounted on said center winding leg and having a top side and a bottom side extending outwardly of said magnetic core, a core clamp disposed at each end of the magnetic core and holding said core in assembled relation, each of said core clamps having a vertically disposed rectangular web portion with a top edge aligned in essentially parallel relation with the top side of said coil and a bottom edge essentially parallel with the bottom side of said coil, at least one lead positioning member formed of a sheet of insulating material, said positioning member including a first part disposed at the bottom side of said coil and including an attaching part disposed at the web portion of one core clamp, a terminal pad having a plurality of horizontally aligned terminals supported on said terminal pad along the top edge of said core clamp but insulated therefrom, a plurality of coil leads connected to said terminals, said coil leads brought out to the bottom side of said coil and extending therefrom over the bottom edge of the web portion of said core clamp for connection to said terminals, means for maintaining said terminal pad and said positioning member in fixed relation with respect to said core clamp, said first part of said positioning member being formed with a plurality of indentations for maintaining the coil leads in a desired spaced relation.

4. The magnetic core and coil assembly set forth in claim 3 wherein said means for maintaining said terminal pad and positioning member in fixed relation with respect to said core is comprised of a pair of tabs integrally formed on said core clamp, said positioning member and said terminal pad being formed with a pair of apertures, each of said apertures including a portion formed to register with one of said tabs to allow said positioning member and said terminal pad to be disposed in an engaging relationship with said tabs.

5. In a magnetic core and coil assembly having a shunt type of magnetic core, a pair of yoke members and a center winding leg comprised of horizontally extending laminations, said yoke members being disposed at the sides of the center winding leg to define coil receiving windows therewith, said magnetic core being held in assembled relation by a pair of core clamps disposed at the ends thereof, each of said core clamps having a vertically extending rectangular web portion, at least one coil disposed on the center winding leg within the coil receiving windows and having a top side and a bottom side extending outwardly of the magnetic core, said web portion of said core clamps having a top edge extending in parallel relation to the top side of said coil and a bottom edge extending in parallel relation to the bottom side of said coil, a terminal lead arrangement comprising a positioning member formed of a sheet of insulating material, said positioning member having a positioning part disposed at the bottom side of said coil and having an attaching part disposed at the web portion of a core clamp, a plurality of terminals, coil leads connected to said terminals, said terminals being laterally aligned with each other and disposed in fixed relation with respect to said core clamp adjacent to the top side of the coil along the top edge of said core clamp, means securing said attaching part in fixed relation with the core clamp, a plurality of indentations formed in said positioning part, said coil leads being disposed at desired relative positions and in desired locations with respect to said terminals by said indentations and brought out over the bottom edge of said web portion to said terminals.

6. In a magnetic core and coil assembly having a magnetic core formed of a pair of yoke members and a center winding leg held in assembled relation by a pair of core clamps disposed at the ends thereof, said core clamps having a web portion disposed vertically at the ends of the magnetic core, a plurality of coils disposed on said center winding leg, each of said coils having a top side and a bottom side extending outwardly of the magnetic core and coil conductors extending therefrom, a coil lead arrangement comprising: a lead positioning means including a positioning part disposed at the bottom side of the coil and an attaching part disposed at the web portion of the core clamp, a plurality of indentations formed in said positioning part, coil leads from the coils being secured in desired relative position by said indentations, a plurality of terminals, said terminals being aligned and supported on the core clamp near an edge of the core clamp adjacent the top side of said coil, and means for maintaining said attaching part in fixed relation with said magnetic core, said coil leads being brought out over the corner of the core and coil assembly and connected to said terminals.

7. The coil lead arrangement as set forth in claim 6 wherein said means for maintaining said attaching part in fixed relation with said magnetic core is comprised of L-shaped tabs extending outwardly of the web portion of said core clamp and formed integrally therewith, said L-shaped tabs being disposed in apertures formed in said attaching part, said L-shaped tabs causing said attaching part to be retained in fixed relation with respect to the core clamp.

8. A core and coil assembly comprising a shunt type of magnetic core having a pair of yoke members and a center winding leg with at least one coil, a core clamp disposed at each end of the magnetic core and holding said core in assembled relation, each of said core clamps having a vertically disposed web portion, at least one tab formed in said web portion of each of said core clamps, a positioning member disposed at each end of the core and formed of an angulated sheet of insulating material, each of said positioning members having an attaching flap disposed along the web portion of the core clamp and a positioning flap disposed along the side of an electrical coil, said positioning flap being formed with a plurality of indentations, a plurality of coil leads extending from said coil, a terminal pad disposed along each of said attaching flaps, a plurality of terminals aligned and secured at an edge of each of said terminal pads, said terminal pad and said attaching flap of said positioning member formed with apertures adapted to receive said tabs formed on said core clamps, said tabs fixedly securing the attaching flap and the terminal pad disposed thereon, each of said positioning flaps being formed with a plurality of indentations, said coil leads being disposed in said indentations to maintain said coil leads in desired positions, said leads being brought out over the fold of said positioning members and connected to said terminals.

9. The core and coil assembly as set forth in claim 8 wherein a plurality of slots are formed at the fold of said positioning member, said coil leads being disposed within said slots and maintained in the desired relative positions.

10. The core and coil assembly set forth in claim 8 wherein said terminal pads are formed with an insulated flap, said insulated flap being folded over in an overlying relationship with respect to the tabs of said core clamps to prevent the coil conductors from contacting the tabs.

References Cited by the Examiner
UNITED STATES PATENTS

| 1,579,955 | 4/26 | Schermerhorn et al. | 336—192 X |
| 2,562,693 | 7/51 | Brooks | 336—212 |
| 2,722,671 | 11/55 | Zerwes | 336—192 X |
| 3,011,140 | 11/61 | Mittermaier et al. | 336—192 X |
| 3,146,419 | 8/64 | Warren et al. | 336—192 X |

JOHN F. BURNS, *Primary Examiner.*